(12) United States Patent
Kanemoto et al.

(10) Patent No.: US 9,531,011 B2
(45) Date of Patent: Dec. 27, 2016

(54) ELECTRODE PLATE, WOUND ELECTRODE GROUP, AND CYLINDRICAL BATTERY

(71) Applicant: GS Yuasa International Ltd., Kyoto-shi (JP)

(72) Inventors: Manabu Kanemoto, Kyoto (JP); Tadashi Kakeya, Kyoto (JP); Mitsuhiro Kodama, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 204 days.

(21) Appl. No.: 13/766,636

(22) Filed: Feb. 13, 2013

(65) Prior Publication Data

US 2013/0224544 A1 Aug. 29, 2013

(30) Foreign Application Priority Data

Feb. 24, 2012 (JP) ................................ 2012-039281

(51) Int. Cl.
*H01M 4/78* (2006.01)
*H01M 4/04* (2006.01)
*H01M 4/66* (2006.01)
*H01M 10/04* (2006.01)
*H01M 4/24* (2006.01)
*H01M 4/02* (2006.01)

(52) U.S. Cl.
CPC ................ *H01M 4/78* (2013.01); *H01M 4/04* (2013.01); *H01M 4/043* (2013.01); *H01M 4/669* (2013.01); *H01M 10/0431* (2013.01); *H01M 4/242* (2013.01); *H01M 2004/021* (2013.01)

(58) Field of Classification Search
None
See application file for complete search history.

(56) References Cited

U.S. PATENT DOCUMENTS 5,527,638 A 6/1996 Kinoshita et al.
5,849,430 A * 12/1998 Lee .................. H01M 4/742
429/233

(Continued)

FOREIGN PATENT DOCUMENTS

JP 7-073874 A 3/1995
JP 2002-110171 * 4/2002 ............. H01M 4/70

(Continued)

OTHER PUBLICATIONS

English Translation of JP2002-110171.*
English Translation of JP2004-247221.*

*Primary Examiner* — Patrick Ryan
*Assistant Examiner* — Kiran Akhtar
(74) *Attorney, Agent, or Firm* — McGinn IP Law Group, PLLC.

(57) ABSTRACT

An electrode plate is configured by applying an active material onto a base member formed of a punching steel plate, the electrode plate being wound via a separator together with an electrode plate, which has a different polarity, and having an outermost peripheral portion positioned at the outermost periphery of an electrode assembly. The rate of hole area of the base member at a different electrode overlapping portion, which radially inwardly overlaps on a winding terminal end of the electrode plate having the different polarity, is smaller than that of the base member at the outermost peripheral portion.

19 Claims, 13 Drawing Sheets

(56) References Cited

U.S. PATENT DOCUMENTS

2005/0031939 A1* 2/2005 Taguchi ............... H01M 4/242
                                                                                    429/94
2005/0031948 A1* 2/2005 Maeda ............... H01M 2/0202
                                                                                    429/164
2010/0035150 A1    2/2010 Ando et al.

FOREIGN PATENT DOCUMENTS

| JP | 2002-110171 A | 4/2002 | | |
|----|---------------|--------|----|----|
| JP | 2002-319395 A | 10/2002 | | |
| JP | 2004-247221 | * | 9/2004 | ............... H01M 4/74 |
| JP | 2004-247221 A | 9/2004 | | |
| JP | 2005-056674 A | 3/2005 | | |
| JP | 2005-056675 A | 3/2005 | | |
| JP | 2005-056682 A | 3/2005 | | |
| JP | 2005-294010 A | 10/2005 | | |
| JP | 2006-156186 A | 6/2006 | | |
| JP | 2010-040370 A | 2/2010 | | |
| JP | 2012-014870 A | 1/2012 | | |

* cited by examiner

ELECTRODE PLATE, WOUND ELECTRODE GROUP, AND CYLINDRICAL BATTERY

BACKGROUND OF THE INVENTION

1. Field of the Invention

The present invention relates to an electrode plate, a wound electrode group (electrode assembly) using the electrode plate, and a cylindrical battery.

2. Description of the Related Art

An example of conventional negative electrode plates is configured by applying a negative electrode active material onto a base member formed of a punching steel plate. This negative electrode plate is wound via a separator together with a positive electrode plate and has an outermost peripheral portion positioned on the outermost periphery of an electrode assembly.

Conventionally, in order to enhance the mechanical strength of an outermost peripheral portion, the rate of hole area of a base member within a predetermined range from a winding terminal end of the outermost peripheral portion may be set to be smaller than those of other portions, as disclosed in JP-A-2004-247221.

However, with the above configuration, the winding terminal end of the outermost peripheral portion or a winding terminal end of a positive electrode plate is brought into contact with a portion having a large rate of hole area at the base member of a negative electrode plate. When a winding terminal end of a negative or positive electrode plate located on the outermost periphery is pressed inward in a radial direction in a case where, for example, a winding roller pressurizes an electrode assembly in fabricating the electrode assembly, the winding terminal end bites the negative electrode plate with which the winding terminal end is brought into contact, thereby raising a problem that the base member of the negative electrode plate is broken.

In JP-A-2005-56674, a negative electrode plate includes a main body wound inside of an electrode assembly, an outermost peripheral portion wound around the outermost periphery of the electrode assembly, and a boundary portion formed between the main body and the outermost peripheral portion. In the wound electrode assembly, the rate of hole area of the base member that forms the boundary portion of the negative electrode plate is set to be smaller than those of other portions, thereby preventing any occurrence of a crack or the like on the boundary portion.

JP-A-2005-56674 discloses the configuration having the reduced rate of hole area at the boundary portion, which is located at a position circumferentially different from the winding terminal end of the positive electrode plate and the winding terminal end of the negative electrode plate. Therefore, as described above, the winding terminal end of the negative electrode plate or the winding terminal end of the positive electrode plate bites a portion having a large rate of hole area at the base member of the negative electrode plate, thereby raising a problem of breakage of the base member of the negative electrode plate.

SUMMARY OF THE INVENTION

An electrode plate according to an aspect of the present invention is configured by applying an active material onto a base member formed of a punching steel plate, the electrode plate being wound via a separator together with an electrode plate, which has a different polarity, and having an outermost peripheral portion positioned at the outermost periphery of an electrode assembly, wherein the rate of hole area of the base member at a different electrode overlapping portion, which radially inwardly overlaps on a winding terminal end of the electrode plate having the different polarity, is smaller than that of the base member at the outermost peripheral portion.

BRIEF DESCRIPTION OF THE DRAWINGS

The foregoing and other features of the invention will become apparent to one skilled in the art to which the present invention relates upon consideration of the invention with reference to the accompanying drawings, wherein.

DETAILED DESCRIPTION OF THE INVENTION

Figure 1:
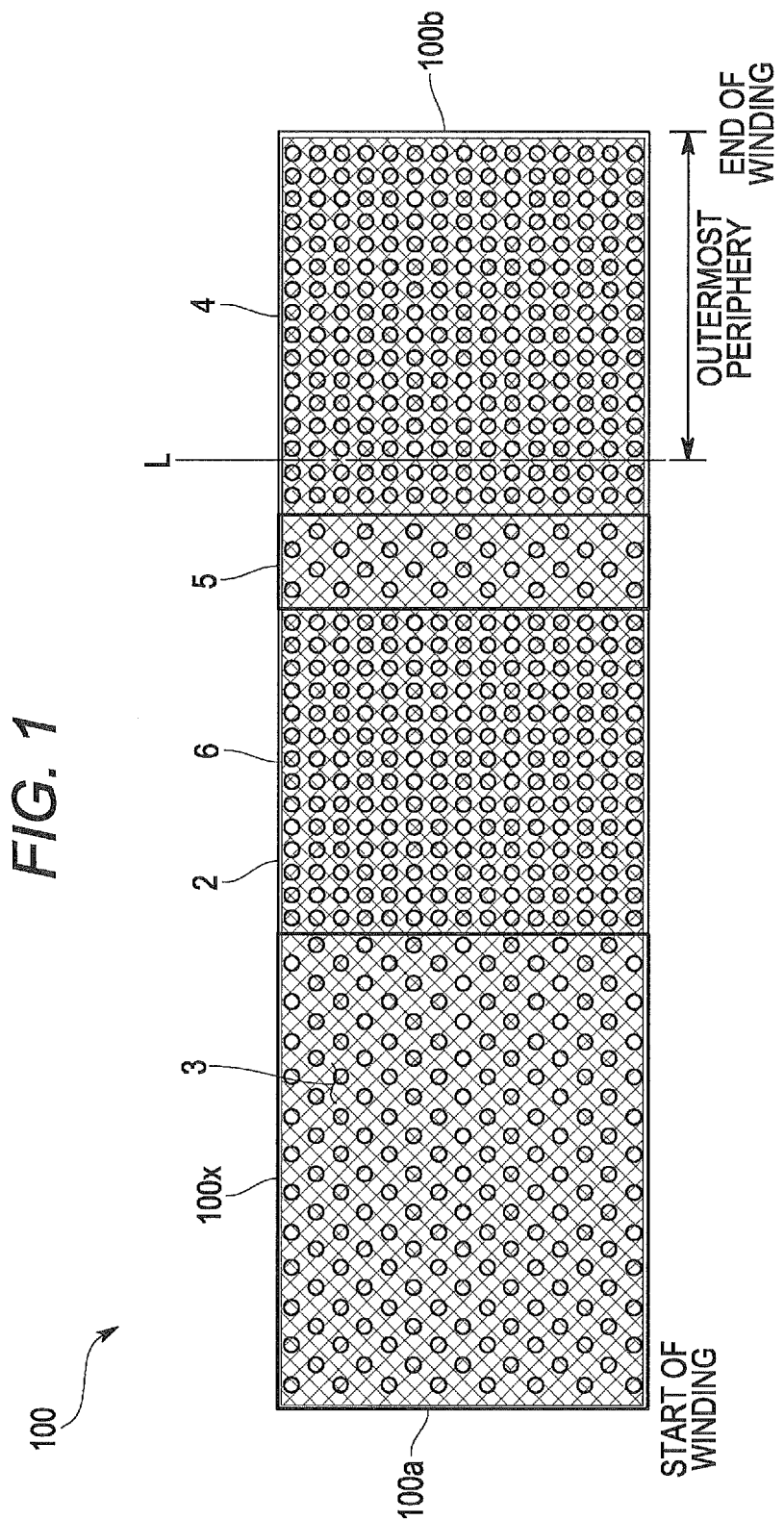
FIG. 1 is a plan view showing a negative electrode plate in a first embodiment.

An electrode plate is configured by applying an active material onto a base member formed of a punching steel plate, the electrode plate being wound via a separator together with an electrode plate, which has a different polarity, and having an outermost peripheral portion positioned at the outermost periphery of an electrode assembly. The rate of hole area of the base member at a different electrode overlapping portion, which radially inwardly overlaps on a winding terminal end of the electrode plate having the different polarity, is smaller than that of the base member at the outermost peripheral portion.

With this configuration, the rate of hole area of the base member at the different electrode overlapping portion, which radially inwardly overlaps on the winding terminal end of the electrode plate having the different polarity, is smaller than that of the base member at the outermost peripheral portion. Therefore, the mechanical strength of the base member overlapping the winding terminal end can be enhanced, thereby preventing the base member from being broken due to a pressure exerted by the winding terminal end of the electrode plate having the different polarity.

The rate of hole area of a winding start end side region including the winding start end may be smaller than that of the base member at a winding terminal end side portion adjacent to the winding start end side region. With this configuration, it is possible to effectively suppress any breakage caused by an increase in curvature of the winding start end side region including the winding start end during winding.

The rates of hole area of the base member at the winding start end side portion and the winding terminal end side portion adjacent to the different electrode overlapping portion may be substantially equal to each other. With this configuration, because the rates of hole area of the base member at the winding start end side portion and the winding terminal end side portion adjacent to the different electrode overlapping portion are larger than that of the base member at the different electrode overlapping portion, the breakage of the base member can be suppressed while the packing density of the active material can be increased as possible.

The rate of hole area of the base member at the winding start end side portion adjacent to the different electrode overlapping portion, the rate of hole area of the base member at the different electrode overlapping portion, and the rate of hole area of the base member at the winding terminal end side portion adjacent to the different electrode overlapping portion may be large, small, and intermediate, respectively. With this configuration, the breakage of the base member can be suppressed while the mechanical strength of the base member at the outermost peripheral portion can be enhanced.

The rate of hole area of the base member at a same electrode overlapping portion, which radially inwardly overlaps on a winding terminal end of the electrode plate having the same polarity, may be smaller than that of the base member at the winding terminal end side in the outermost peripheral portion. With this configuration, the rate of hole area of the base member at the same electrode overlapping portion, which overlaps on the winding terminal end in the outermost peripheral portion, is smaller than that of the base member at the winding terminal end side in the outermost peripheral portion. Therefore, the mechanical strength of the base member overlapping the winding terminal end can be enhanced, thereby preventing the base member from being broken due to a pressure exerted by the winding terminal end.

The thickness of the base member may be 20 μm or more and 100 μm or less. Within this range, the breakage of the base member can be reduced by reducing the rate of hole area. It is preferable that the thickness of the base member be 35 μm or more and 45 μm or less. Within this range, the breakage of the base member can be significantly reduced.

The packing density of the active material at the outermost peripheral portion may be smaller than that of the active material at other portions on the winding start end side than the outermost peripheral portion. With this configuration, because the packing density of the active material at the outermost peripheral portion is small, the outermost peripheral portion is deformable, and a stress to be exerted on the base member is reduced, thereby suppressing the breakage of the base member.

A fabricating method for an electrode plate in which the rate of hole area of a base member at a different electrode overlapping portion, which radially inwardly overlaps on a winding terminal end of the electrode plate having a different polarity, is smaller than that of the base member at an outermost peripheral portion, and the packing density of an active material at the outermost peripheral portion is smaller than that of the active material at other portions than the outermost peripheral portion, may include the steps of: applying the active material onto both sides of the base member extending in a winding axial direction, and removing part of the active material applied onto the outermost peripheral portion; pressing the active material applied onto the base member together with the base member; and cutting the base member extending in the winding axial direction. In a conventional a base member, which extends in a winding direction, in order to reduce the packing density of an active material at an outermost periphery portion, the base member first needs to be cut, and then, the active material needs to be removed from each electrode plate. In the fabricating method according to an aspect of the present invention, since the base member extending not in the winding direction but in the winding axial direction is used, the active material applying process can follow the active material removing process, thus enhancing productivity. Moreover, with the base member extending in the winding axial direction, it is difficult to form a solid portion in the winding axial direction of the electrode plate. In the case of no solid portion in the winding axial direction, the strength in the winding axial direction is reduced, thereby raising a problem of a breakage of the base member due to a pressurizing roller during electrode plate winding. On the other hand, the base member according to the present invention can solve the problem of the breakage of the base member during the electrode plate winding by reducing the rate of hole area at the overlapping portion.

In the case where the active material filling densities at the outermost peripheral portion and the other portions are different from each other, pressures exerted on the outermost peripheral portion and the other portions of the base member in the pressing process are different from each other, therefore, the pressure is unevenly exerted on the base member, thereby inducing a breakage of the base member. In view of this, in the base member according to an aspect of the present invention, the rate of hole area of the base member at the region of the high active material packing density is made to be smaller than that of the outermost peripheral portion, thereby enhancing the strength. Thus, it is possible to suppress the breakage of the base member in the pressing process. Additionally, it is preferable to provide a cutting process in which a continuous sheet for the base member is cut into electrode plates before the pressing process and a rotating process in which the electrode plate is rotated at an angle of 90° C. The cutting and rotating processes are performed before the pressing process, therefore, even if the base member extends in the winding axial direction, a constant pressure can be uniformly exerted in the winding direction, thus suppressing the active material from falling at the outermost peripheral portion.

According to the aspects of the present invention described above, it is possible to suppress a breakage of the base member due to pressurization or the like in fabricating a wound electrode assembly.

<First Embodiment>

A first embodiment of the present invention will be described hereinafter with reference to the attached drawings.

A negative electrode plate 100 in the present embodiment is formed into a belt-like shape by applying a negative electrode active material 3 including a hydrogen occlusion alloy to a base member 2 formed of a punching steel plate having a pore pattern of a pore diameter of 1 mm. The thickness of the base member 2 is 35 μm. The base member 2 is plated with nickel in a thickness of 1 μm. The resultant negative electrode plate 100 is spirally wound via separators together with a positive electrode plate 300, thereby forming a wound electrode assembly. The wound electrode assembly is housed in a cylindrical battery case to obtain a cylindrical battery.

Figure 2:
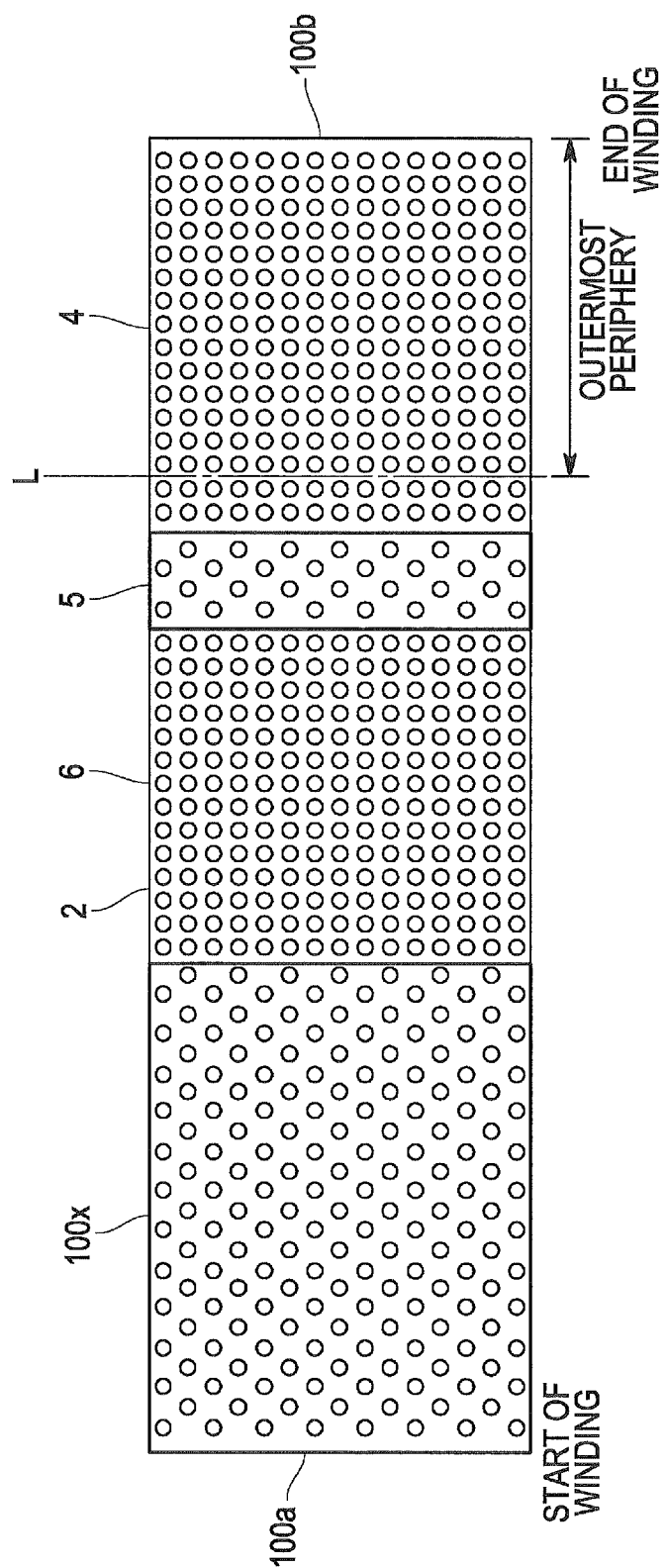
FIG. 2 is a plan view showing a base member in the first embodiment.
Figure 3:
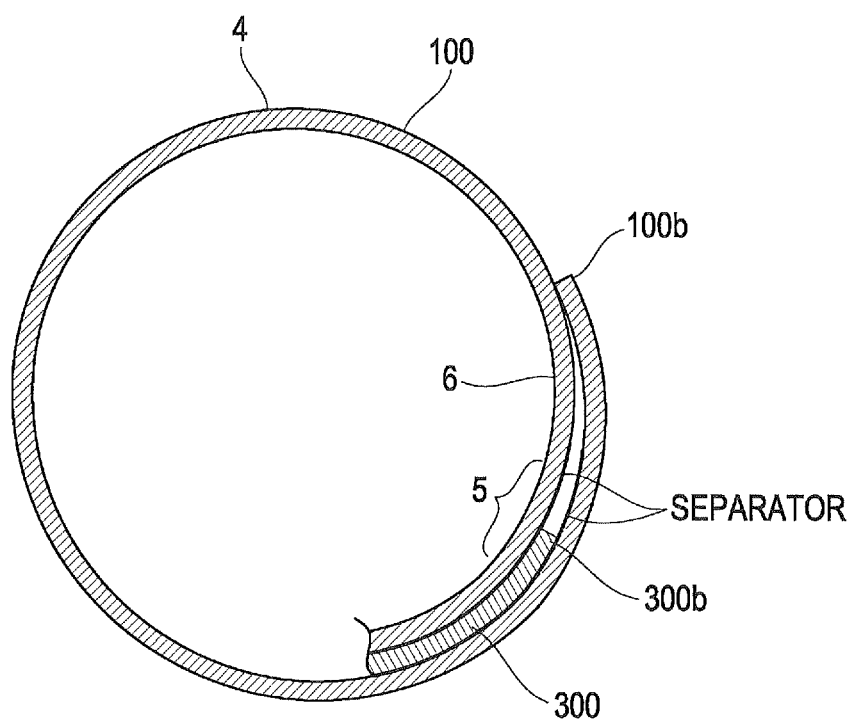
FIG. 3 is a cross-sectional view schematically showing the wound state of the negative electrode plate in the first embodiment.

Specifically, the negative electrode plate 100 includes an outermost peripheral portion 4 positioned on the outermost periphery of the wound electrode assembly and a main portion 6 that is other than the outermost peripheral portion 4, as shown in FIGS. 1 to 3. Reference character L in FIGS. 1 and 2 designates the boundary between the outermost peripheral portion 4 and the main portion 6.

The negative electrode plate 100 is configured such that the rate of hole area of the base member 2 at a portion overlapping on a winding terminal end 300b of the positive electrode plate 300 (hereinafter referred to as a different electrode overlapping portion 5) is smaller at least than that of the base member 2 at the outermost peripheral portion 4 in the state in which the negative electrode plate 100 is wound via the separators together with the positive electrode 300.

The different electrode overlapping portion 5 is formed in the main portion 6. The rate of hole area of the base member 2 on the side of a winding start end 100a adjacent to the different electrode overlapping portion 5 and the rate of hole area of the base member 2 on the side of a winding terminal end 100b adjacent to the different electrode overlapping portion 5 are substantially the same, and are greater than the rate of hole area of the base member 2 at the different electrode overlapping portion 5. In the present embodiment, the winding start end side portion is a predetermined range set on the side of the winding start end 100a from the different electrode overlapping portion 5 whereas the winding terminal end side portion is the whole range from the different electrode overlapping portion 5 to the winding terminal end 100b and includes the outermost peripheral portion 4.

In the negative electrode plate 100, the rate of hole area of the base member 2 in a region 100x on the winding start end side in the predetermined range including the winding start end 100a is set to be smaller than that of the base member 2 at the winding terminal end side portion adjacent to the region 100x on the winding start end side, as shown in FIGS. 1 and 2. In the present embodiment, the rate of hole area of the base member 2 in the region 100x on the winding start end side and the rate of hole area of the base member 2 at the different electrode overlapping portion 5 are substantially the same. Because the rate of hole area of the base member 2 in the region 100x on the winding start end side is small, even if the curvature of the region 100x on the winding start end side including the winding start end 100a during winding becomes great, the negative electrode plate 100 can be effectively suppressed from being broken.

Additionally, the negative electrode plate 100 in the present embodiment is configured such that the packing density of the negative electrode active material 3 in the outermost peripheral portion 4 becomes smaller than that of the negative electrode active material 3 in the main portion 6. Specifically, the thickness of the negative electrode active material 3 to be applied to the outermost peripheral portion 4 is set to be smaller than that of the negative electrode active material 3 to be applied to the main portion 6. The thickness of the negative electrode plate 100, to which the negative electrode active material 3 has been applied, is, for example, 0.38 mm at the main portion 6 whereas 0.25 mm at the outermost peripheral portion 4. Because the packing density of the negative electrode active material 3 at the outermost peripheral portion 4 is small, the outermost peripheral portion 4 tends to be readily deformed, and further, a stress to be exerted on the base member 2 is reduced, thus suppressing breakage according to the deformation of the base member 2.

Next, one example of a fabricating method for the negative electrode plate 100 in the present embodiment will be described below.

Figure 4:
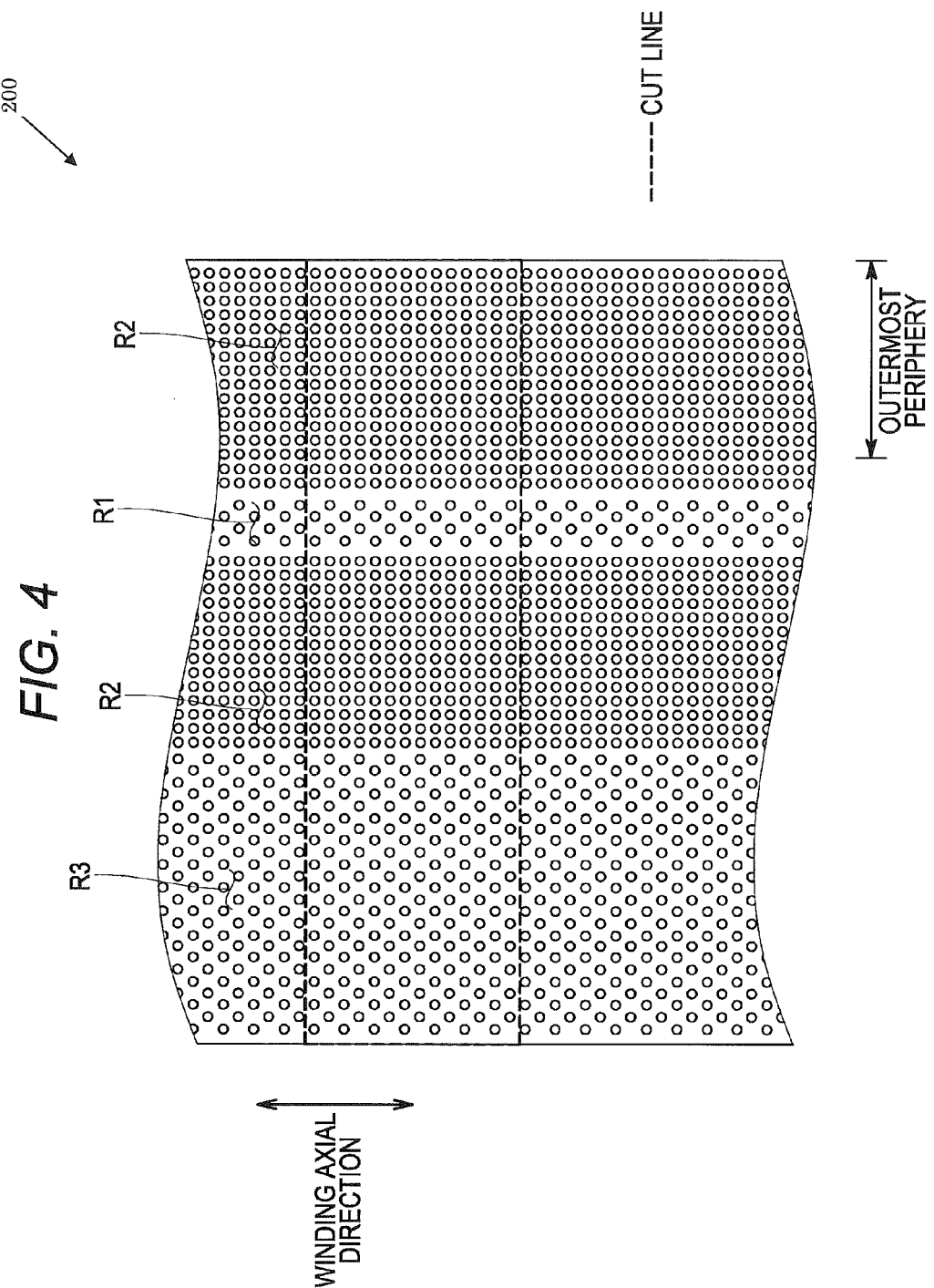
FIG. 4 is a plan view showing a material for the negative electrode plate in the first embodiment.

As shown in FIG. 4, in an applying process, the negative electrode active material 3 is applied to the entire surfaces of both surfaces of a base member (i.e., a main material) 200 having numerous holes therein such that the rate of hole area of a region R1 serving as the different electrode overlapping portion 5 and the rate of hole area of a region R3 serving as the region 100x on the winding start end side become smaller than that of other regions R2, and further, part of an active material applied to the region R2 serving as the outermost peripheral portion 4 is removed; in a drying process, the negative electrode active material 3 applied onto the main material 200 in the applying process is dried; and in a pressing process, the negative electrode active material 3 dried in the drying process is pressed together with the main material 200. These processes are sequentially performed. After the pressing process, the main material 200 extending in a winding axial direction is cut along cut lines in FIG. 4 in a cutting process, and the negative electrode plate 100 in the present embodiment is fabricated. The negative electrode plate 100 fabricated as described above is wound via the separators together with the positive electrode plate 300, to be pressed outside in a radial direction by a winding roller, thus obtaining a wound electrode assembly.

With the negative electrode plate 100 in the present embodiment configured as described above, the rate of hole area of the base member 2 at the different electrode overlapping portion 5 that overlaps the winding terminal end 300b of the positive electrode plate 300 is smaller at least than that of the base member 2 at the outermost peripheral portion 4, therefore, the mechanical strength of the base member 2 at the different electrode overlapping portion 5 can be increased, thus preventing the base member 2 from being broken by a pressure from the winding terminal end 300b of the positive electrode plate 300. In the case where, for example, an electrode assembly is pressurized by the winding roller in fabricating the electrode assembly, the winding terminal end 300b hardly bites the different electrode overlapping portion 5 even if the winding terminal end 300b of the positive electrode plate 300 is pressed inward in the radial direction to be brought into contact with the different electrode overlapping portion 5, thus preventing the base member 2 of the negative electrode plate 100 from being broken. Consequently, it is possible to suppress an increase in inside resistance of the negative electrode plate 100 and to fabricate a battery having a desired capacity.

Moreover, the rate of hole area of the base member 2 in the region 100x on the winding start end side is smaller than that of the base member 2 on the winding terminal end side adjacent to the region 100x on the winding start end side. Consequently, even if the curvature of the region 100x on the winding start end side including the winding start end 100a is increased during winding, the breakage can be effectively suppressed.

Additionally, in the present embodiment, the rate of hole area of the base member 2 on the side of the winding start end 100a adjacent to the different electrode overlapping portion 5 is equal to that of the base member 2 on the side of the winding terminal end 100b adjacent to the different electrode overlapping portion 5, so that the breakage of the base member 2 at the winding terminal end 100b can be suppressed while the filling amount of the negative electrode active material 3 to be housed in a battery case can be increased as much as possible.

<Second Embodiment>

A second embodiment of the present invention will be described hereinafter with reference to the attached drawings.

Figure 5:
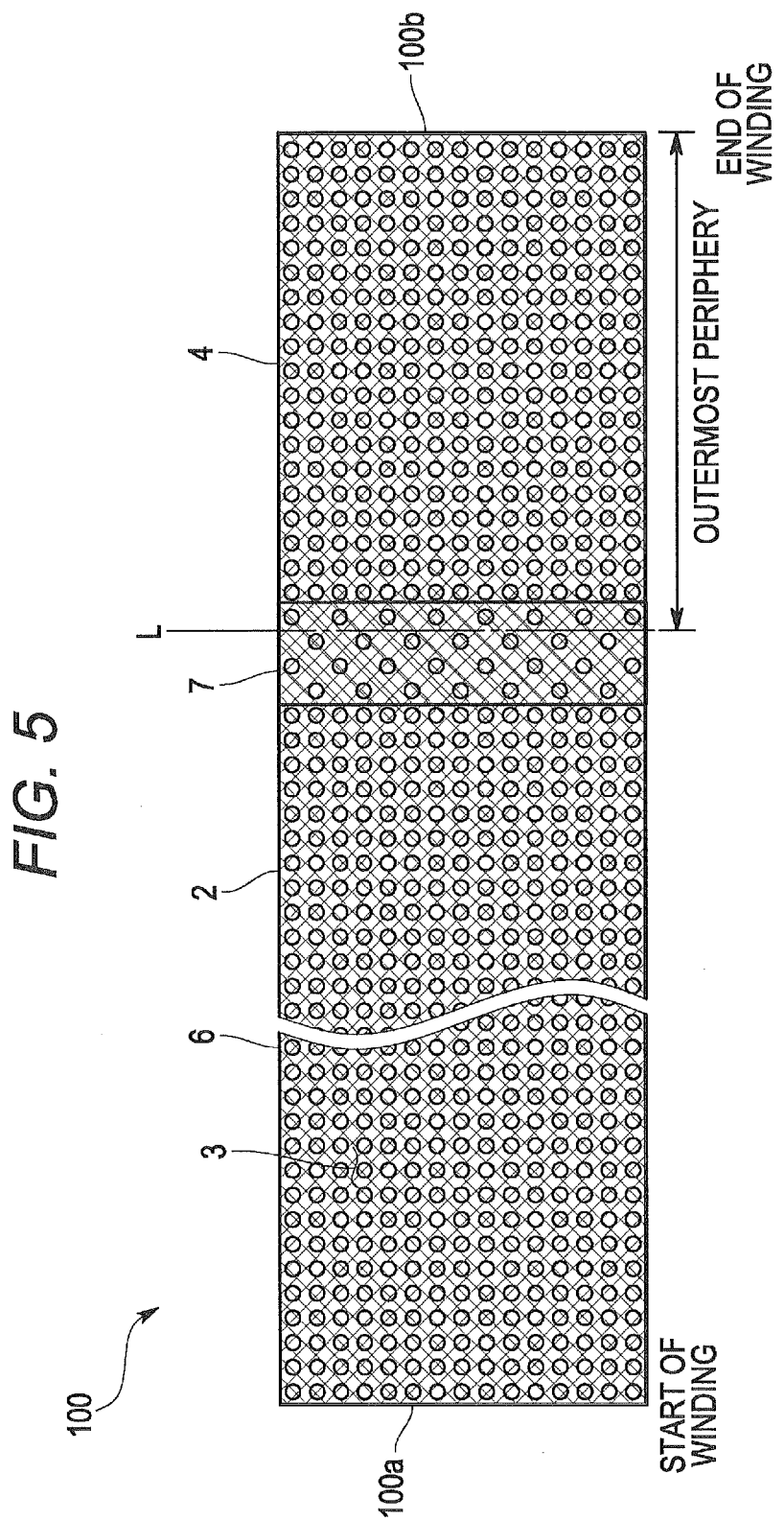
FIG. 5 is a plan view showing a negative electrode plate in a second embodiment.
Figure 6:
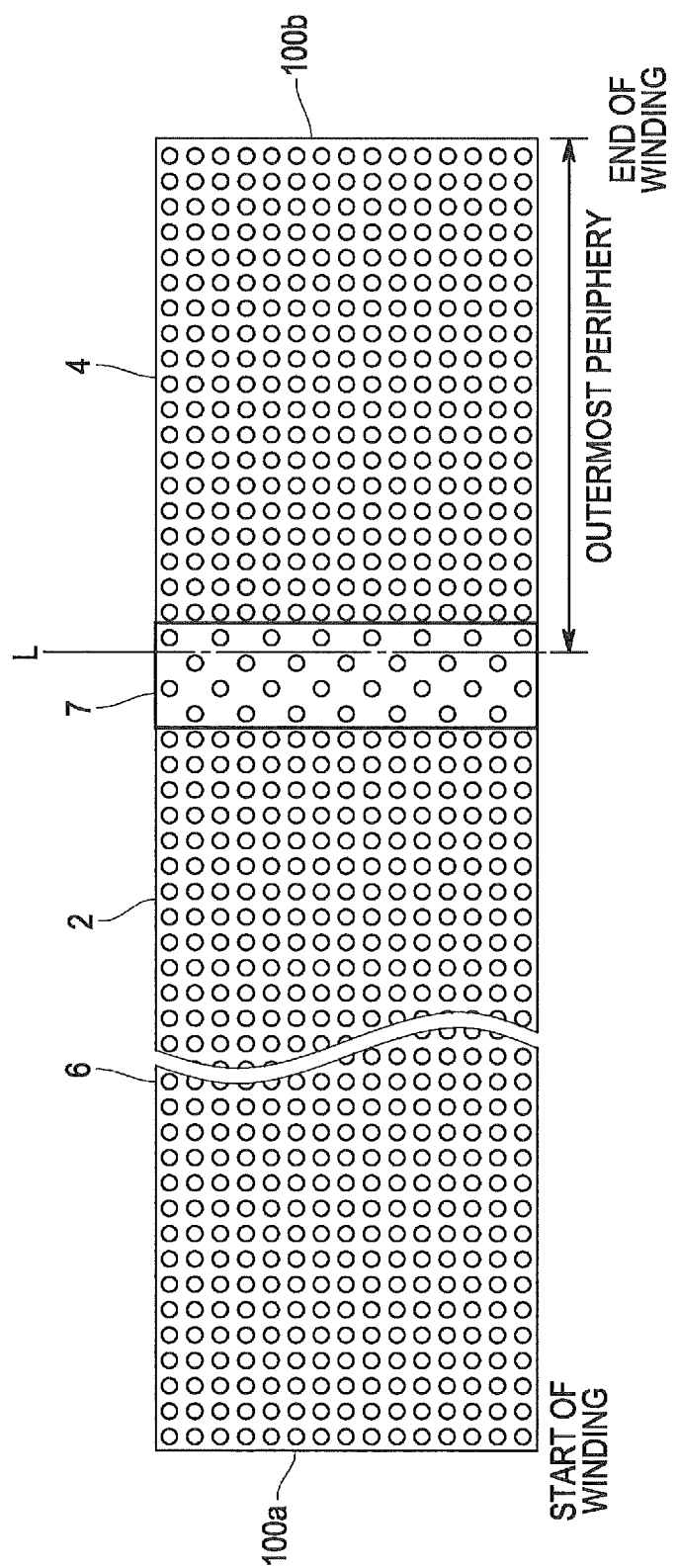
FIG. 6 is a plan view showing a base member in the second embodiment.
Figure 7:
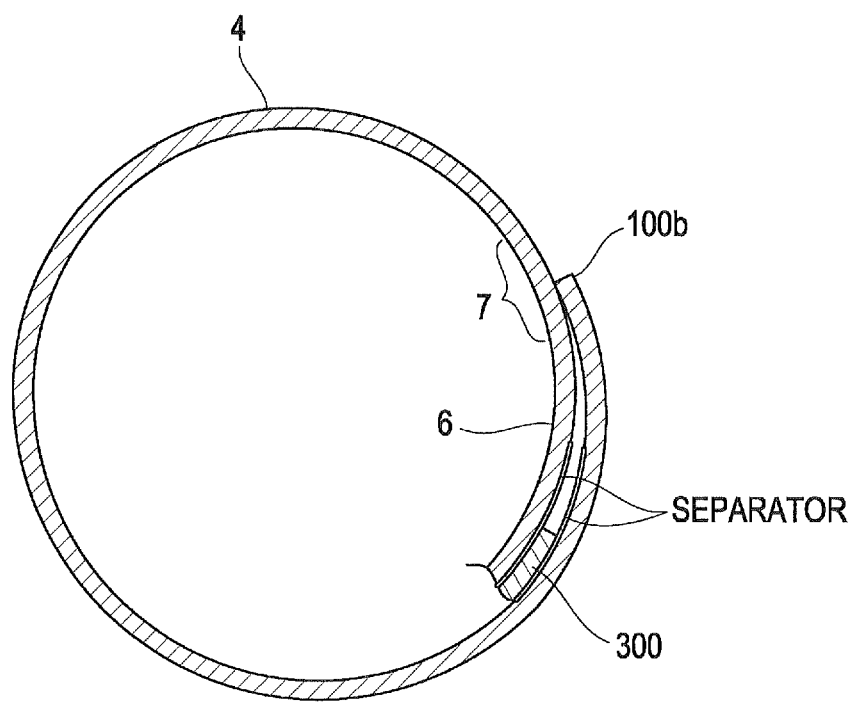
FIG. 7 is a cross-sectional view schematically showing the wound state of the negative electrode plate in the second embodiment.

A negative electrode plate 100 in the present embodiment includes an outermost peripheral portion 4 positioned on the outermost periphery of a wound electrode assembly and a main portion 6 that is other than the outermost peripheral portion 4, as shown in FIGS. 5 to 7. Reference character L in FIGS. 1 and 2 designates the boundary between the outermost peripheral portion 4 and the main portion 6.

The negative electrode plate 100 is configured such that the rate of hole area of the base member 2 at a portion overlapping a winding terminal end 100*b* of the outermost peripheral portion 4 (hereinafter referred to as a same electrode overlapping portion 7) is smaller at least than that of the base member 2 at a winding start end side portion adjacent to the same electrode overlapping portion 7 in the state in which it is wound via separators together with the positive electrode 300.

More specifically, the rate of hole area of the base member 2 at the winding start end portion adjacent to the same electrode overlapping portion 7 is equal to that of the base member 2 at the winding terminal end side portion adjacent to the same electrode overlapping portion 7, and further, the rate of hole area of the base member 2 at the same electrode overlapping portion 7 is smaller than the above rates of hole area. In the present embodiment, the winding start end side portion is the entire range from the same electrode overlapping portion 7 to the winding start end 100*a*; whereas the winding terminal end side portion is the entire range from the same electrode overlapping portion 7 to the winding terminal end 100*b*. Here, the same electrode overlapping portion 7 includes the boundary L between the outermost peripheral portion 4 and the main portion 6, and further, is formed over predetermined ranges toward the winding start end 100*a* and the winding terminal end 100*b* from the boundary L, as shown in FIGS. 5 and 6.

Additionally, the negative electrode plate 100 in the present embodiment is configured such that the packing density of the negative electrode active material 3 in the outermost peripheral portion 4 becomes smaller than that of the negative electrode active material 3 in the main portion 6. Specifically, the thickness of the negative electrode active material 3 to be applied to the outermost peripheral portion 4 is smaller than that of the negative electrode active material 3 to be applied to the main portion 6. Because the packing density of the negative electrode active material 3 at the outermost peripheral portion 4 is smaller, the outermost peripheral portion 4 is readily deformed, and further, a stress to be exerted on a base member 2 is reduced, thus suppressing a breakage according to the deformation of the base member 2. Additionally, in the present embodiment, the portion having the small rate of hole area is formed in such a manner as to include the boundary L between the outermost peripheral portion 4 and the main portion 6, thereby preventing the base member 2 from being broken by a strain generated in the vicinity of the boundary L caused by pressing the negative electrode active material 3.

Next, one example of a fabricating method for the negative electrode plate 100 in the present embodiment will be described below.

Figure 8:
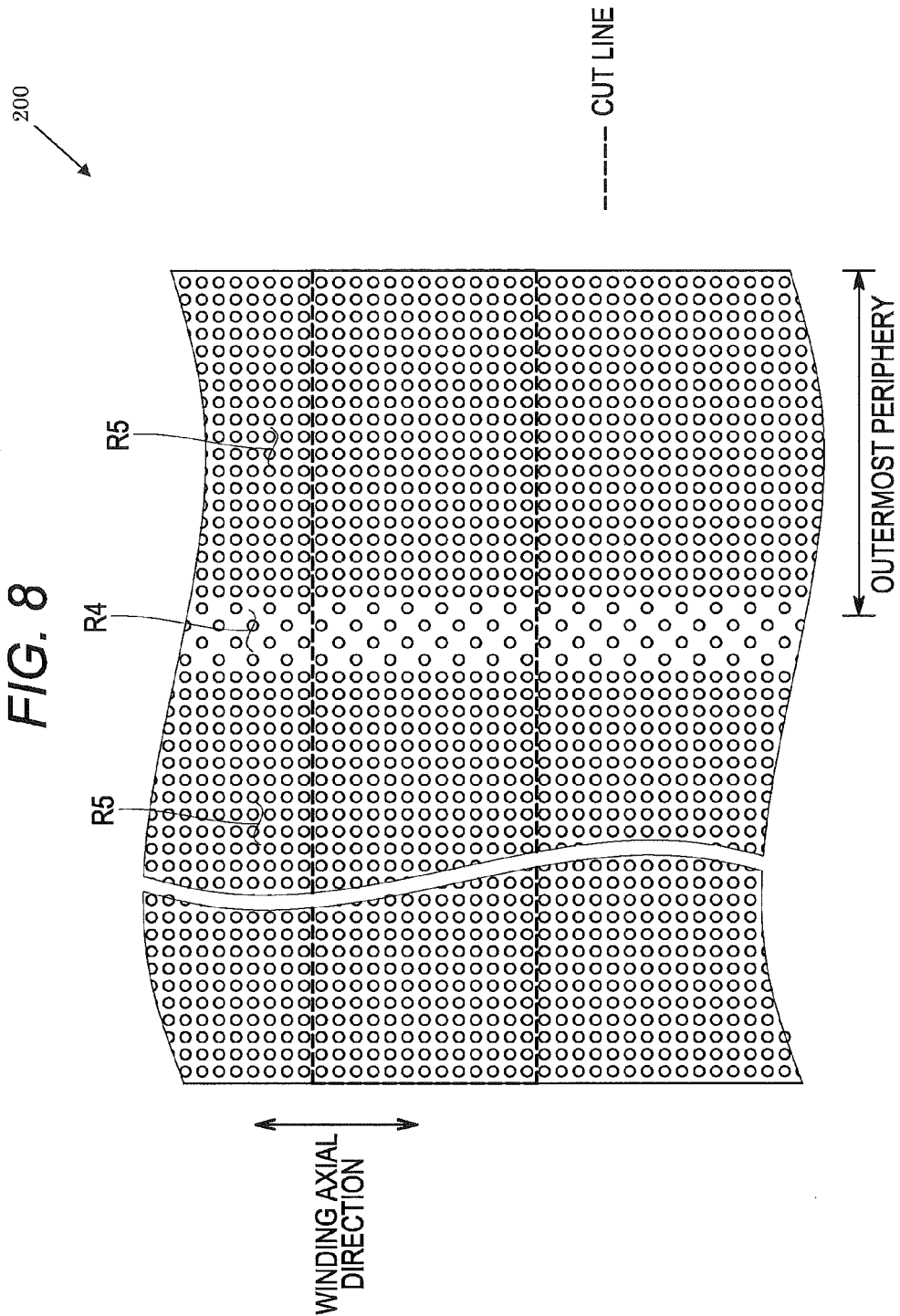
FIG. 8 is a plan view showing a material for the negative electrode plate in the second embodiment.

As shown in FIG. 8, in an applying process, the negative electrode active material 3 is applied to the entire surfaces of both surfaces of a base member (i.e., a main material) 200 having numerous holes therein such that the rate of hole area of a region R4 serving as the same electrode overlapping portion 5 becomes smaller than those of other regions R5, and further, part of an active material applied to the region R5 serving as the outermost peripheral portion 4 is removed; in a drying process, the negative electrode active material 3 applied onto the main material 200 in the applying process is dried; and in a pressing process, the negative electrode active material 3 dried in the drying process is pressed together with the main material 200. These processes are sequentially performed. After the pressing process, the main material 200 extending in a winding axial direction is cut along cut lines in FIG. 8 in a cutting process, and the negative electrode plate 100 in the present embodiment is fabricated. The negative electrode plate 100 fabricated as described above is wound via the separators together with the positive electrode plate 300, to be pressed outside in a radial direction by a winding roller, thus obtaining a wound electrode assembly.

With the negative electrode plate 100 in the present embodiment such configured as described above, the rate of hole area of the base member 2 at the same electrode overlapping portion 5 that overlaps the winding terminal end 100*b* of the outermost peripheral portion 4 is smaller at least than that of the base member 2 at the winding start end side portion adjacent to the same electrode overlapping portion 5, therefore, the mechanical strength of the base member 2 at the same electrode overlapping portion 5 can be enhanced, thus preventing the base member 2 from being broken by a pressure from the winding terminal end 100*b*. In the case where, for example, an electrode assembly is pressurized by the winding roller in fabricating the electrode assembly or the electrode assembly is brought into contact with a battery case when the electrode assembly is inserted into the battery case, the winding terminal end 100*b* hardly bites the same electrode overlapping portion 5 even if the winding terminal end 100*b* of the negative electrode plate 100 positioned at the outermost periphery is pressed inward in the radial direction to be brought into contact with the same electrode overlapping portion 5, thus preventing the base member 2 of the negative electrode plate 100 from being broken. Consequently, it is possible to suppress an increase in inside resistance of the negative electrode plate 100 and to fabricate a battery having a desired capacity.

Additionally, in the present embodiment, the rate of hole area of the winding start end side portion adjacent to the same electrode overlapping portion 5 is equal to that of the winding terminal end side portion adjacent to the same electrode overlapping portion 5, so that the breakage of the base member 2 at the winding terminal end side portion is suppressed while the filling amount of the negative electrode active material 3 to be housed in a battery case can be increased as much as possible.

The present invention is not limited to the above embodiments.

For example, although the negative electrode plate is configured to be positioned at the outermost periphery of the wound electrode assembly in the above embodiments, the positive electrode plate may be positioned at the outermost periphery of the wound electrode assembly. In this case, the positive electrode plate is obtained by applying a positive electrode active material onto a base member formed of a punching steel plate, and further, the rate of hole area of a different electrode overlapping portion at which the positive electrode plate radially inwardly overlaps on the winding terminal end of the negative electrode plate is set to be smaller than at least that of an outermost peripheral portion. Alternatively, the rate of hole area of a same electrode overlapping portion that overlaps on a winding terminal end in the outermost peripheral portion of the positive electrode plate is set to be smaller at least than that of a winding start end side portion adjacent to the same electrode overlapping portion.

In the first embodiment, the rate of hole area of the winding start end side portion adjacent to the different electrode overlapping portion 5 and the rate of hole area of the winding terminal end side portion adjacent to the different electrode overlapping portion 5 are equal to each other, and further, they are greater than that of the different electrode overlapping portion 5. Alternatively, the interrelationship among the rate of hole area of the winding start end side portion adjacent to the different electrode overlapping portion 5, the rate of hole area of the winding terminal end side portion adjacent to the different electrode overlapping portion 5, and the rate of hole area of the different electrode overlapping portion 5 is variously modified.

Figure 9:
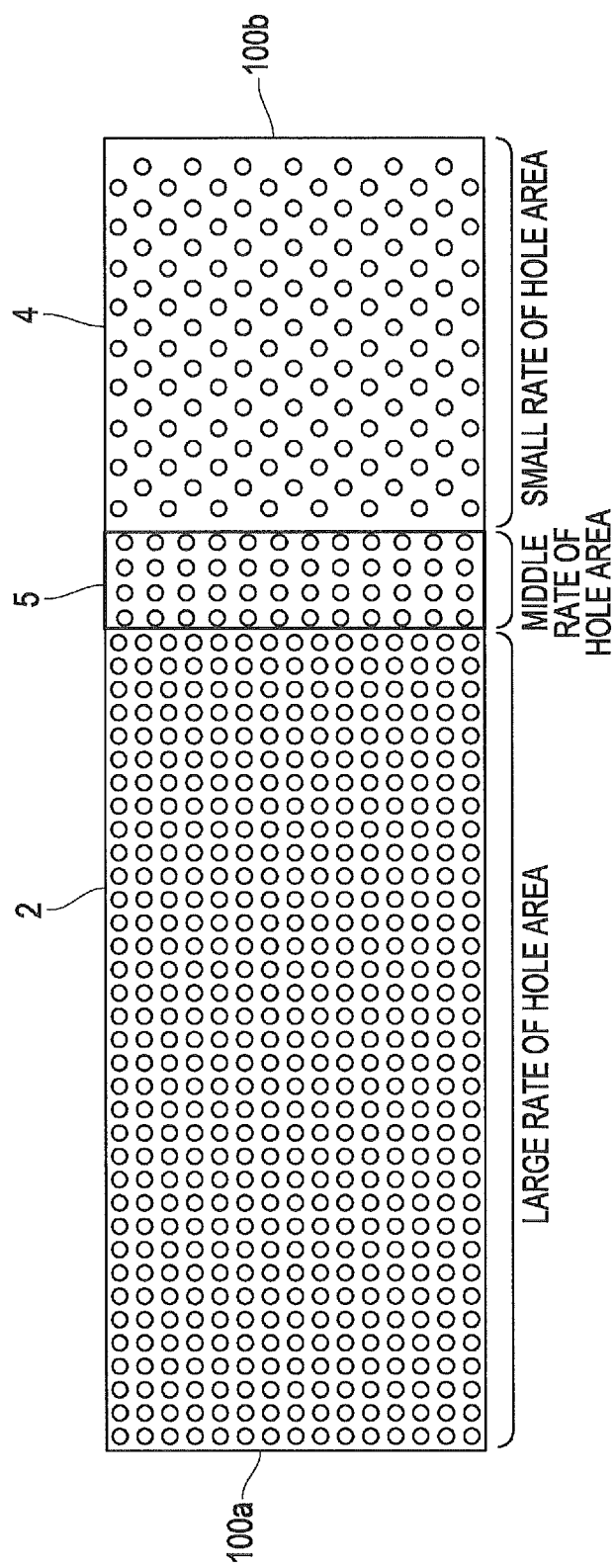
FIG. 9 is a plan view showing a base member in a comparative example.
Figure 10:
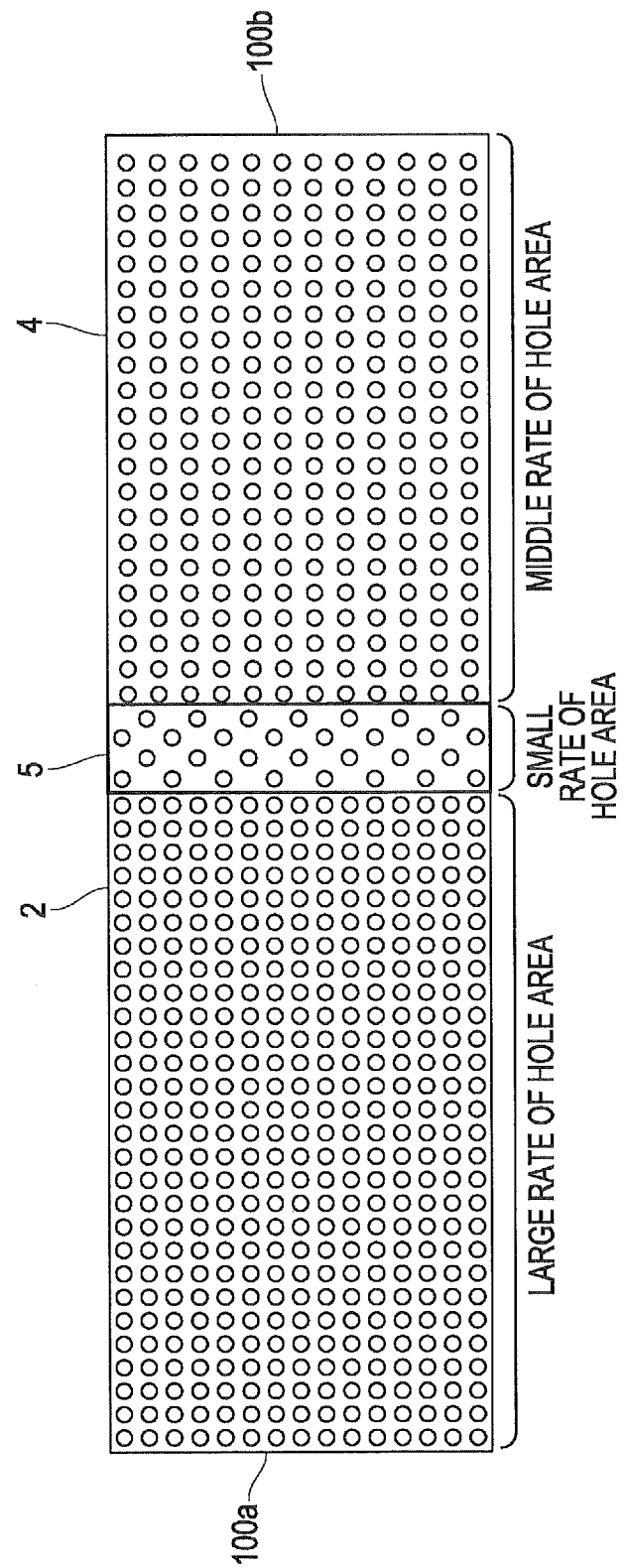
FIG. 10 is a plan view showing a base member in a modification.

For example, as shown in FIG. 10, the rate of hole area of a base member 2 on the side of a winding start end 100a adjacent to a different electrode overlapping portion 5, the rate of hole area of the base member 2 at the different electrode overlapping portion 5, and the rate of hole area of the base member 2 on the side of a winding terminal end 100b adjacent to the different electrode overlapping portion 5 may be large, small, and intermediate, respectively. Here, a negative electrode plate having a same electrode overlapping portion 7 also may be configured in the same manner. With this configuration, the mechanical strength of an outermost peripheral portion 4 is enhanced, thereby suppressing the base member 2 at the outermost peripheral portion 4 from being broken. In the meantime, the mechanical strength of the different electrode overlapping portion 5 can be enhanced more than that of other portions at a main portion 6. Incidentally, as shown in FIG. 9, although the rate of hole area of a base member 2 on the side of a winding start end 100a adjacent to a different electrode overlapping portion 5, the rate of hole area of the base member 2 at the different electrode overlapping portion 5, and the rate of hole area of the base member 2 on the side of a winding terminal end 100b adjacent to the different electrode overlapping portion 5 may be large, intermediate, and small, respectively, it is difficult in this case to satisfactorily suppress the base member 2 at the different electrode overlapping portion 5 from being broken.

Moreover, the rate of hole area of the negative electrode plate 100 may be configured in such a manner as to gradually become smaller from the winding start end 100a to the winding terminal end 100b such that the rate of hole area of the different electrode overlapping portion 5 is smaller than that of the winding start end side portion. Here, the number or diameter of holes may be varied, or the intervals between holes may be gradually larger from the winding start end 100a to the winding terminal end 100b in a mode in which there are different rates of hole area, like the above embodiment. Incidentally, the negative electrode plate having the same electrode overlapping portion 7 may be configured in the same manner.

Although the winding start end side portion adjacent to the different electrode overlapping portion 5 includes the winding start end side region 100x on the winding start end side in the first embodiment, the winding start end side portion may not include the winding start end side region 100x on the winding start end side.

Figure 11:
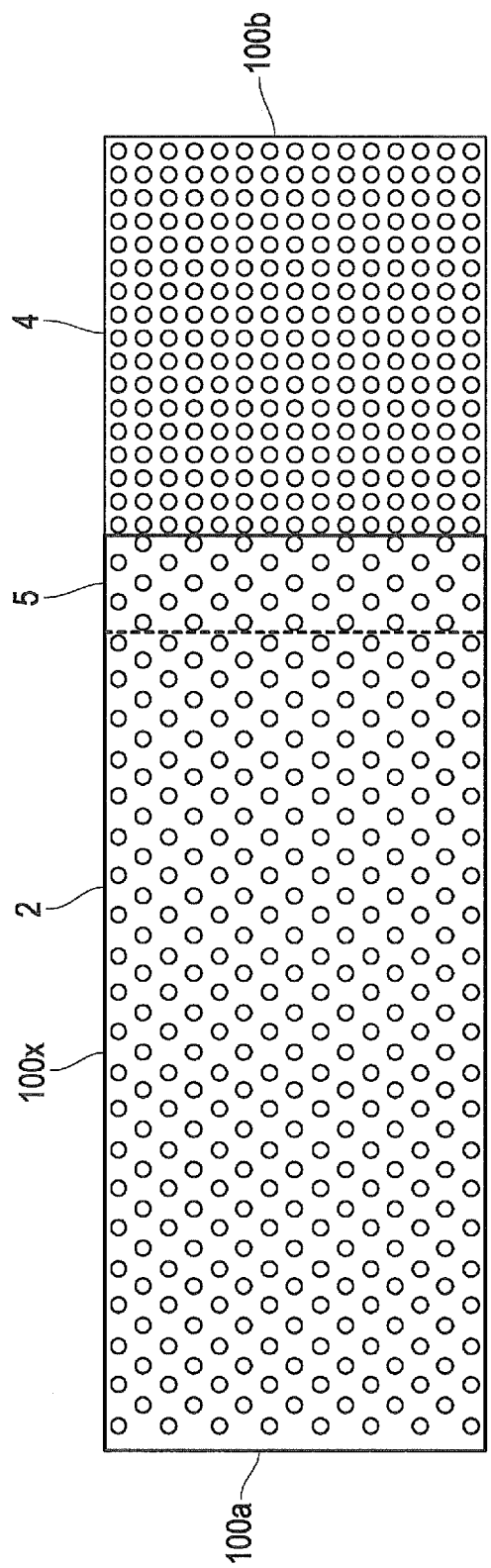
FIG. 11 is a plan view showing a base member in another modification.

Additionally, as shown in FIG. 11, the winding start end side region 100x on the winding start end side may be formed also on the same electrode overlapping portion 5, and the rate of hole area of the region 100x on the winding start end side may be made to be equal to that of the same electrode overlapping portion 5.

Figure 12:
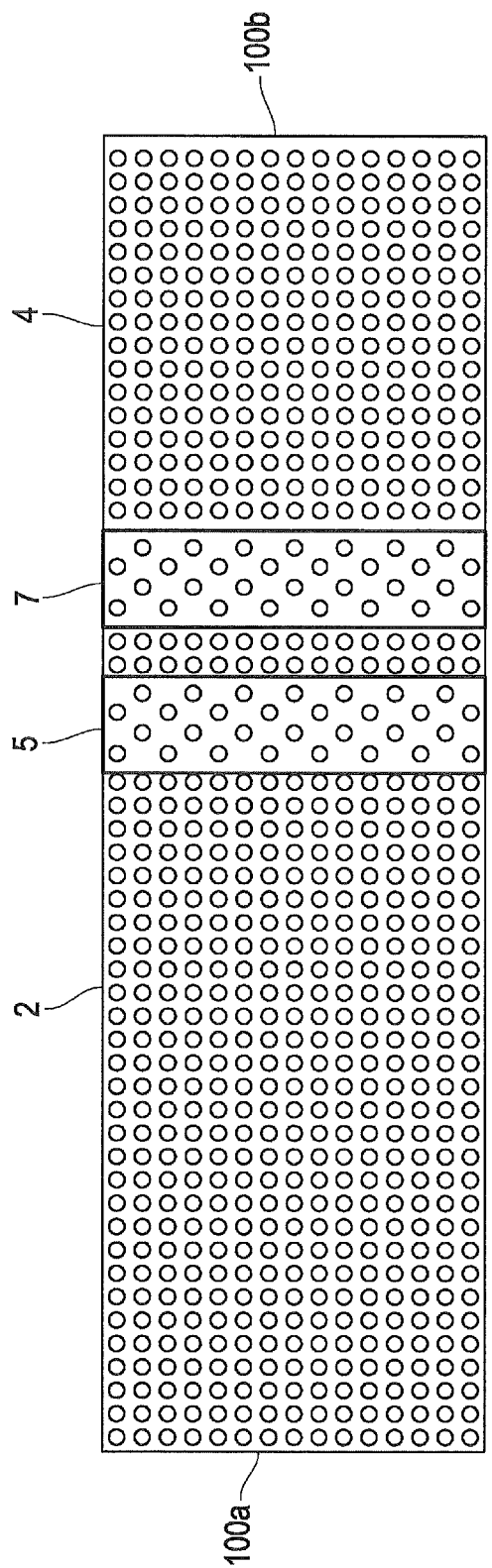
FIG. 12 is a plan view showing a base member in a further modification.
Figure 13:
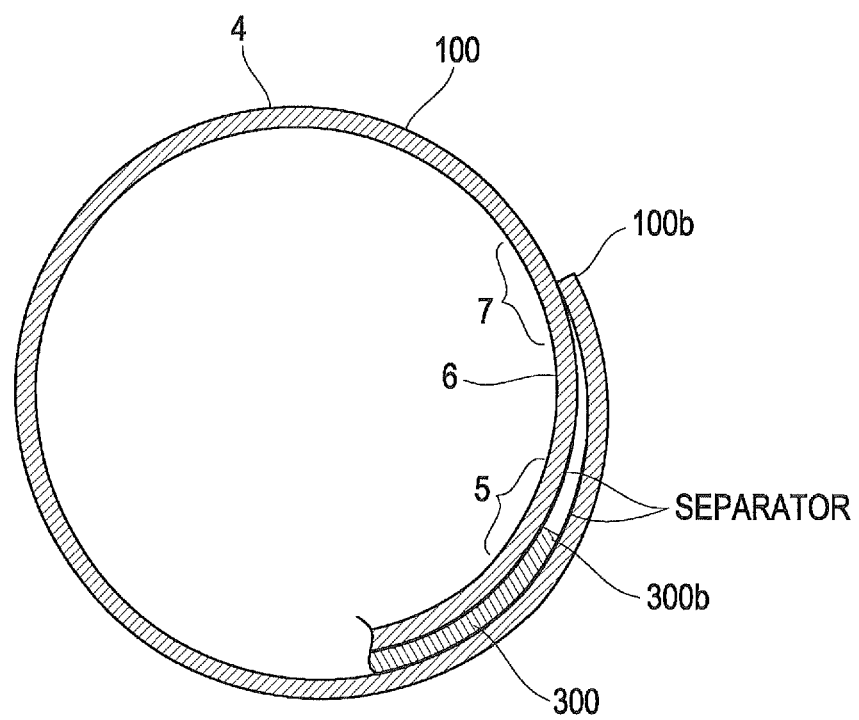
FIG. 13 is a cross-sectional view schematically showing the wound state of a base member in the modification.

In addition, the electrode plate may include both of the different electrode overlapping portion 5 and the same electrode overlapping portion 7, as shown in FIGS. 12 and 13. The different electrode overlapping portion 5 and the same electrode overlapping portion 7 may be disposed at positions different from each other in a winding direction, as shown in FIG. 13, or they may be integrated at the same position.

The rates of hole area may be varied in not only the winding direction but also in the winding axial direction. In the case where the rates of hole area are varied in the winding axial direction, the mechanical strength can be enhanced in the winding axial direction. When a solid portion without any holes is formed in the winding axial direction, it is possible to prevent the plate from being broken due to the connection of holes in the winding axial direction.

Besides, the present invention is not limited to the above embodiments, therefore, it is to be understood that various modifications should be achieved without departing from the subject matter.

What is claimed is:

1. A wound electrode assembly using an electrode plate configured by applying an active material onto a base member formed of a punching steel plate, the electrode plate being wound via a separator together with an electrode plate, which has a different polarity, and having an outermost peripheral portion positioned at an outermost periphery of the electrode assembly,
    wherein a rate of hole area per unit area of the base member at a different electrode overlapping portion, which radially inwardly overlaps on a winding terminal end of the electrode plate having the different polarity, is smaller than that of the base member at the outermost peripheral portion, and
    wherein a packing density of the active material at the outermost peripheral portion is less than a packing density of the active material at other portions than the outermost peripheral portion.

2. The wound electrode assembly according to claim 1, wherein a rate of hole area per unit area of a winding start end side region including the winding start end is smaller than that of the base member at the outermost peripheral portion.

3. The wound electrode assembly according to claim 1, wherein rates of hole area per unit area of a winding start end side portion and a winding terminal end side portion adjacent to the different electrode overlapping portion are equal to each other.

4. The wound electrode assembly according to claim 1, wherein a rate of hole area per unit area of a winding start end side portion adjacent to the different electrode overlapping portion, a rate of hole area per unit area of the different electrode overlapping portion, and a rate of hole area per unit area of a winding terminal end side portion adjacent to the different electrode overlapping portion are large, small, and intermediate, respectively.

5. The wound electrode assembly according to claim 1, wherein a rate of hole area per unit area of the base member at a same electrode overlapping portion, which radially inwardly overlaps on a winding terminal end of the electrode plate having the same polarity, is smaller than that of the base member at a winding terminal end side in the outermost peripheral portion.

6. The wound electrode assembly according to claim 1, wherein a rate of hole area of the base member at a same electrode overlapping portion, which overlaps on the winding terminal end of the electrode plate having a same polarity, is smaller than that of the base member at a winding terminal end side in the outermost peripheral portion.

7. A cylindrical battery using the wound electrode assembly according to claim 1.

8. The wound electrode assembly according to claim 1, wherein the electrode plate is fabricated by a method comprising:
applying the active material onto both sides of the base member extending in a winding axial direction, and removing a part of the active material applied onto the outermost peripheral portion;
pressing the active material applied onto the base member together with the base member; and
cutting the base member extending in the winding axial direction.

9. The wound electrode assembly according to claim 1, wherein the rate of the hole area of the base member is defined as a number of holes per unit area in the base member.

10. The wound electrode assembly according to claim 1, wherein the electrode plate includes:
the outermost peripheral portion; and
a main portion that is other than the outermost peripheral portion, the different electrode overlapping portion being located in the main portion.

11. The wound electrode assembly according to claim 10, wherein an entirety of the different electrode overlapping portion is located in the main portion.

12. The wound electrode assembly according to claim 10, wherein the packing density of the active material at the outermost peripheral portion is less than a packing density of the active material at the main portion.

13. The wound electrode assembly according to claim 10, wherein a thickness of the active material at the outermost peripheral portion is less than a thickness of the active material at the main portion.

14. The wound electrode assembly according to claim 1, wherein a rate of hole area per unit area of the base member on a side of a winding start end, adjacent to the different electrode overlapping portion, and a rate of hole area per unit area of the base member on a side of a winding terminal end, adjacent to the different electrode overlapping portion, are the same.

15. The wound electrode assembly according to claim 14, wherein the rate of hole area of the base member on the side of the winding start end and the rate of hole area of the base member on the side of the winding terminal end are greater than the rate of hole area of the base member at the different electrode overlapping portion.

16. The wound electrode assembly according to claim 14, wherein the base member on the side of the winding start end is located on the side of the winding start end from the different electrode overlapping portion, and the base member on the side of the winding terminal end is located in an entire range from the different electrode overlapping portion to the winding terminal end and includes the outermost peripheral portion.

17. The wound electrode assembly according to claim 14, wherein, in the electrode plate, a rate of hole area per unit area of the base member in a region on the side of the winding start end is less than that of the base member at the side of the winding terminal end adjacent to the region on the side of the winding start end.

18. The wound electrode assembly according to claim 17, wherein the rate of hole area of the base member in the region on the side of the winding start end and the rate of hole area of the base member at the different electrode overlapping portion are the same.

19. A wound electrode assembly using an electrode plate configured by applying an active material onto a base member formed of a punching steel plate, the electrode plate being wound via a separator together with an electrode plate, which has a different polarity, and having an outermost peripheral portion positioned at an outermost periphery of the electrode assembly,
wherein a rate of hole area per unit area of the base member at a different electrode overlapping portion, which radially inwardly overlaps on a winding terminal end of the electrode plate having the different polarity, is smaller than that of the base member of the outermost peripheral portion.

* * * * *